United States Patent
Owatari

Patent Number: 5,092,926
Date of Patent: Mar. 3, 1992

[54] INK-JET PRINTING INK

[75] Inventor: Akio Owatari, Suwa, Japan

[73] Assignee: Seiko Epson Corporation, Tokyo, Japan

[21] Appl. No.: 416,188

[22] Filed: Oct. 3, 1989

[30] Foreign Application Priority Data

Oct. 3, 1988 [JP] Japan .................. 63-249211
Oct. 3, 1988 [JP] Japan .................. 63-249212

[51] Int. Cl.$^5$ .............................. C09D 11/02
[52] U.S. Cl. ........................... 106/22; 106/20
[58] Field of Search ..................... 106/20, 22

[56] References Cited

U.S. PATENT DOCUMENTS

| | | | |
|---|---|---|---|
| 4,279,653 | 7/1981 | Makishima et al. | 106/22 |
| 4,290,812 | 9/1981 | Loock | 106/22 |
| 4,373,954 | 2/1983 | Eida et al. | 106/22 |
| 4,489,334 | 12/1984 | Owatari | 106/22 |
| 4,664,815 | 5/1987 | Ozawa et al. | 106/22 |
| 4,683,002 | 7/1987 | Mirua et al. | 106/22 |
| 4,698,151 | 10/1987 | Ozawa et al. | 106/22 |
| 4,732,613 | 3/1988 | Shioya et al. | 106/22 |
| 4,778,525 | 10/1988 | Kobayashi et al. | 106/22 |
| 4,810,292 | 3/1989 | Palmer et al. | 106/22 |
| 4,867,789 | 9/1989 | Eida et al. | 106/22 |

FOREIGN PATENT DOCUMENTS 52-74406  6/1977  Japan .
1526017  9/1978  United Kingdom .

OTHER PUBLICATIONS

Grant & Hackh's Chemical Dictionary, 5th Ed, 3-88, pp. 394 and 538.

*Primary Examiner*—Mark L. Bell
*Assistant Examiner*—Helene Klemanski
*Attorney, Agent, or Firm*—Blum Kaplan

[57] ABSTRACT

An ink-jet printing ink composition which has high printing stability after long periods of time and at high temperatures is provided. The ink-jet printing ink composition is an aqueous ink having a nitrite ion concentration between about 0.2 to 10 parts per million (ppm) in order to lower the concentration of dissolved gas in the ink.

15 Claims, 1 Drawing Sheet

INK-JET PRINTING INK

BACKGROUND OF THE INVENTION

This invention relates to an ink-jet printing ink which has improved printing stability.

Ink-jet printers are known in the art and have advantages over other printing techniques, such as freedom from noise and attainment of high-speed printing, high-quality printing, and color printing. In the ink-jet printing process, an ink is compressed by an electromechanical transducing-vibration or electrothermal transducing-bubble and a high-pressure ink particle is then ejected from a nozzle for printing.

A disadvantage of ordinary inks used in this process is that ordinary ink contains dissolved gases which upon compression from bubbles or bubble nuclei. This results in blank spots in the printing known as the "missing dot" condition.

For this reason, ink-jet printing inks have been subjected to treatment, such as deaeration or fine filtration, to remove bubble nuclei, and then stored in a bag or vessel having low air permeability.

The disadvantage of these treatment and storage methods is that after a period of time, and particularly when the ink is exposed to high temperatures, bubbles still form in the ink notwithstanding the initial deaeration. Thus, after a period of time or exposure to high temperatures, the ink develops the same problems as untreated ink, i.e. an inability to be uniformly ejected from the nozzle. Thus, the prior art inks for ink-jet printers are subjected to limitations of time and temperature which affect the transportation, shelf-life, storage, and use of the ink.

Accordingly, an ink-jet printing ink which can perform in an ink jet printer after long periods of time and at high temperatures is desired.

SUMMARY OF THE INVENTION

Generally speaking, in accordance with the instant invention, an ink-jet printing ink having a nitrite ion concentration in the ink of between 0.2 to 10 parts per million (ppm) is provided In a particularly preferred embodiment, the ink-jet printing ink includes a dye having at least one azo linkage in the molecular structure and has a nitrite ion concentration in the ink of between 0.2 to 10 ppm.

Accordingly, it is an object of the instant invention to provide an improved ink-jet printing ink.

Another of the object of the instant invention is to provide and ink-jet printing ink which resists the formation of bubbles over extended periods of time.

A further object of the instant invention is to provide an ink-jet printing ink which resists a formation of bubbles at high temperatures.

An additional object of the subject invention is to provide a ink-jet printing ink which can be transported over long distances or at high temperatures while resisting the formation of bubbles.

Yet another object of the instant invention is to provide an ink-jet printing ink which has a long shelf life.

Still another object of the instant invention is to provide an ink-jet printing ink which is capable of being stored over long periods of time and may therefore be dispensed in larger volumes without the formation of bubbles.

Yet another object of the instant invention is to provide an ink-jet printing ink which is capable of functioning in ink-jet printers, which operate at high temperatures, without the formation of bubbles.

Still other objects and advantages of the invention will in part be obvious and will in part be apparent from the specification.

The invention accordingly comprises a composition of matter possessing the characteristics, properties, and the relation of constituents, the several steps and the relation of one or more of such steps with respect to each of the others, and the article possessing the features, properties, and the relation of elements, which are exemplified in the following detailed disclosure and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
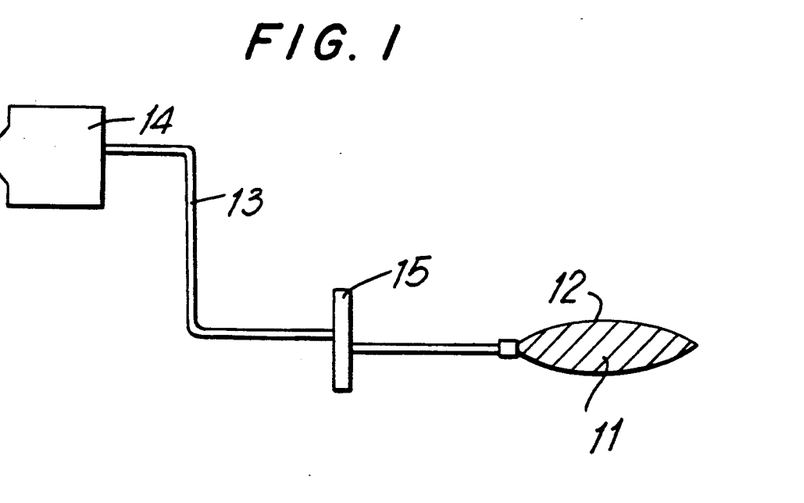
FIG. 1 is a block diagram illustrating the ink passage in an ink-jet printer for use with an ink-jet printing ink in accordance with the invention.

FIG. 1 illustrates the passage of ink in an ink-jet printer. An ink-jet printing ink 11 is held in an ink tank 12 and is fed through an ink feed pipe 13 to a print head 14. Foreign matter and bubble nuclei are removed in a filter 15 in feed pipe 13. Any bubbles formed in the passage will flow with the ink into the printing head, causing the aforementioned problem of uneven ink dispersal.

In general, when ordinary ink-jet printing inks are subjected to the pressure generated by an ink-jet printer, gases dissolved in the ink tend to form bubbles. For this reason, as is disclosed in Japanese Patent Laid-Open No. 74406/77, attempts have been made to lower the concentration of gas in the ink by reducing the amount of oxygen dissolved in the ink through the addition of a nitrite. However, this technique is less than satisfactory in lowering the final concentration of nitrogen dissolved in the ink, because even when an ink has been initially completely freed of dissolved nitrogen and then hermetically sealed in a container having a low coefficient of gas permeability, the nitrogen concentration of the ink increases with time.

Figure 2:
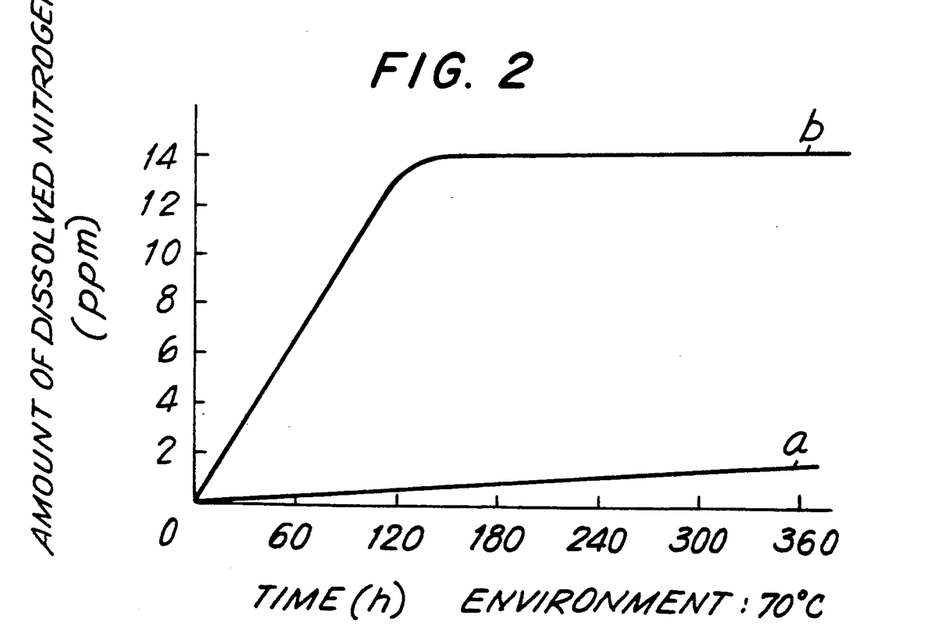
FIG. 2 is a graph of the parts per million of nitrogen dissolved in (a) pure water hermetically sealed in an aluminum laminate bag and (b) a prior art ink of a 3% aqueous solution of a dye having three azo linkages, at a temperature of 70° C. over a period of 360 hours.

Reference is now made to FIG. 2, which shows this increase of nitrogen concentration in an ink compared to water over time. The ink includes a 3% aqueous solution of a dye having 3 azo linkages (Direct Black 154) and is represented by curve (b). The increase of the nitrogen concentration over time of pure water is represented by curve (a). The ink and the water were both stored in identical hermetically-sealed bags.

The amount of dissolved nitrogen was measured by gas chromatography (with a column packed with Molecular Sieve 5A manufactured by Gasukuro Kogyo, Inc.). As can be seen from FIG. 2, the concentration of nitrogen in the ink rises dramatically over time whereas the concentration of nitrogen in the water increases very little during the same period of time. This increase of nitrogen concentration in the ink occurs even though the bag used to store the ink has excellent gas shielding properties, and the ink has been deaerated or an oxygen reducer has been added to the ink. As shown in FIG. 2, after 120 hours at 70° C., the amount of dissolved nitrogen has increased to 14 ppm. The presence of bubbles in the ink has been confirmed when the amounts of dissolved nitrogen exceeded this value.

Based on the assumption that the generation of nitrogen is caused by impurities in the ink, the present inventors determined that the presence of a nitrite ion and a dye, particularly one having at least one azo linkage, causes the nitrogen generation. When the ink contains a dye having at least one azo linkage, if the nitrite ion concentration in the ink is adjusted to 10 ppm or less, the formation of bubbles is completely eliminated even when the ink is left to stand at a temperature of 70° C. for 15 days. Thus, this ink prepared in accordance with the invention can satisfy the severest possible operating conditions.

When the nitrite ion concentration is reduced below 0.2 ppm, the resulting print tends to undergo the "curved flight" phenomenon, after the printer has been out of use for a long period of time. "Curved flight" means that the printing is either misaligned or missing. Accordingly, the nitrite ion concentration of the ink should be between about 0.2 to about 10 ppm.

If the dye in the ink does not contain any azo linkages, "curved flight" may be observed irrespective of the nitrite ion concentration after the printer has been out of use for a long period of time. Therefore, in the preferred ink compositions in accordance with the invention, the dye should have at least one azo linkage in its molecular structure and the nitrite concentration of the ink should be between about 0.2 to about 10 ppm.

The nitrite ion concentration in accordance with the invention can be adjusted to the 0.2–10 ppm range by making use of a sulfamic acid neutralization method commonly known in the art which removes nitrite ion. However, it is difficult to control the nitrite ion concentration in the range of 0.2 to 10 ppm using this method, and sulfate groups remain in the ink as well. Better methods of controlling the nitrite ion include passing the ink through an ion exchange resin to remove nitrous acid through absorption, and passing the ink through an ultrafiltration membrane to separate and remove the nitrite ion. After the nitrite ion concentration in the ink has been adjusted from 0.2 to 10 ppm, the ink may then be deaerated and sealed in a bag or vessel which has low gas permeability.

The printing ink in accordance with the invention principally includes a dye as a colorant, a wetting agent for preventing the clogging of the nozzle, and water as a solvent. In order to adjust the nitrite ion concentration in the ink to the 0.2-10 ppm range, a salt of nitrous acid in low concentration is included in the ink composition.

During synthesis of a dye having an azo linkage in its molecular structure, sodium nitrite is used when an aromatic amine is diazotized. The resulting excess sodium nitrite makes it necessary to lower the sodium nitrite concentration during the synthesis of the dye.

The dye used in the ink compositions in accordance with the invention may be any direct dyes, acidic dyes, or basic dyes listed in the Color Index. In particular, it is preferred to use a dye having at least one azo linkage in its molecular structure with a high solubility in water, and a wetting agent. When the proportion of the dye in the ink is high, the nitrite ion concentration of the ink also increases. In this case the nitrite ion should be preliminarily removed by passing the aqueous dye solution through an ion exchange resin. Addition of a dye in an amount of 0.5 to 10 parts by weight is optimal for the purpose of providing an ink composition suitable for attaining a satisfactory printing density.

The structure of suitable dyes which may be included in the ink-jet compositions in accordance with the invention include the following Dyes No.1~No. 23 (No. 24~26 Dyes: Comparative dyes).

No. 1

No. 2

No. 3

No. 4

-continued

No. 5

No. 6

No. 7

No. 8

No. 9

No. 10

No. 11

No. 12

No. 13

-continued

No. 14

No. 15

No. 16

No. 17

No. 18

No. 19

No. 20

No. 21

-continued

No. 22

No. 23

No. 24

No. 25

No. 26

A wetting agent is an important component for preventing printing inks from drying at the nozzle of the head of the ink-jet printer. In the printing ink in accordance with the invention, water-soluble organic solvents as wetting agents may be included. Examples of suitable water-soluble organic solvents include polyhydric alcohols, ether and ester derivatives of polyhydric alcohols, water-soluble amines, and cyclic nitrogenous compounds. Since these compounds are substantially free from any salt of nitrous acid, no particular treatment is necessary for the removal thereof.

Specific examples of the organic solvents include polyhydric alcohols such as ethylene glycol, diethylene glycol, triethylene glycol, propylene glycol, polyethylene glycol and glycerin, alkyl ether derivatives of the polyhydric alcohols such as ethylene glycol monoethyl ether, ethylene glycol monomethyl ether, diethylene glycol monoethyl ether, diethylene glycol, dimethyl ether, diethylene glycol methyl ethyl ether and triethylene glycol monomethyl ether, ester derivatives of the polyhydric alcohols such as ethylene glycol monomethyl ether acetate, diethylene glycol monoethyl ether acetate, glycerin monoacetate and glycerin diacetate, water-soluble amines such as mono-, di- and triethanolamines and polyoxyethyleneamine, and cyclic nitrogenous compounds such as N-methyl-2-pyrrolidone. Although the larger the amount of water-soluble organic solvents, the better the effect of preventing the drying, too much solvent is unfavorable, because the viscosity of the recording ink is also increased.

In general, the viscosity of the ink has a significant effect on the ejection cycle of ink particles. An increase in the viscosity makes it difficult to increase the ejection cycle and makes the ejection characteristics unstable. For this reason, the ink viscosity is preferably 50 mPa.s or less. At this viscosity range, the water-soluble organic solvent is added in an amount between about 5 to 80 percent by weight based on the total weight of the composition. Preferably, between about 5 and 25 weight percent wetting agent is included.

Further, in order to promote the penetration of the printing ink prepared in accordance with the invention into the printing paper, the pH value of the ink may be adjusted from 12 to 14 as proposed in Japanese Patent Laid-Open No. 57862/1981. If necessary, additives such as preservatives, fungicides, chelating agents, and pH adjustors may be properly added. However, attention should be paid when these additives are used because some of them may include a salt of nitrous acid.

The following examples of ink-jet printing inks are for illustrative purposes only and are not in any way intended to limit the scope of the invention as defined in the claims presented hereinafter. The structures of the dyes referenced by number may be found at the end of the Examples.

EXAMPLE 1

| Composition | |
|---|---|
| dye: C.I. Direct Black 154 (commercially available) (Dye No. 16) | 3 parts by weight |
| glycerin | 15 parts by weight |
| ultrapure water | 82 parts by weight |

An ink having the above-described composition was heated with stirring to prepare 500 g of ink. This ink was cooled and passed through an anion exchange resin (Amberlite IRA-410; a product of Japan Organo Co., Ltd.) and then ion-chromatographed to confirm that the nitrite ion concentration was 5 ppm. Thereafter, this ink was filtered through a 1 μm-membrane filter and deaerated, and an aluminum-laminated polyethylene bag having low gas permeability was filled with the treated ink. The polyethylene bag was subjected to submerged sealing to obtain an ink bag containing an ink hermetically sealed therein. The volume of one ink bag was 120 cc.

Four such ink bags were placed in a environment of 70° C. for 15 days. The nitrogen concentration was measured by gas chromatography and found to average 8 ppm. This ink was used for printing with an ink-jet printer HG-2500 (a product of Seiko Epson Corp.). The resulting printing was stable and without dot omissions for all four of the ink bags. The head of the printer filled wit this ink was allowed to stand at room temperature for one month without a cap, and the ink was delivered again. The resulting printing was in good condition without clogging.

COMPARATIVE EXAMPLE 1

An ink having the composition described in Example 1 was prepared without passing through an anion exchange resin. The nitrite ion concentration was 24 ppm. In the same manner as that of Example 1, this ink was filtered and deaerated, hermetically sealed in an aluminum-laminated bag, placed in an environment of 70° C. for 15 days, and then subjected to measurement of nitrogen concentration. The average nitrogen concentration was 14 ppm. The ink bag was opened in water, and it was found that bubbles had formed in the ink bag. Further, printing was conducted with the remaining bags in the same manner as that of Example 1. It was found that all three of the remaining ink bags frequently caused dot omission. Thus, stable printing was not attained.

EXAMPLE 2

| Composition | |
|---|---|
| dye: C.I. Direct Black 168 (commercially available) | 2 parts by weight |
| polyethylene glycol #200 | 10 parts by weight |
| triethylene glycol | 5 parts by weight |
| ultrapure water | 83 parts by weight |

An ink having the above-described composition was prepared in the same manner as that of Example 1 and passed through an ultrafiltration membrane (HF1-43-PM1; a product of Romicon), and ultrapure water was added to compensate for the loss due to concentration by ultrafiltration. Thereafter, it was confirmed that the nitrite ion concentration of the ink was 2 ppm. This ink was filtered, deaerated, and then hermetically sealed in an ink bag, and evaluation was conducted in the same manner as that of Example 1. The amount of nitrogen generated after 15 days was 5 ppm. Further, printing stability was excellent, and no clogging occurred even after one month.

COMPARATIVE EXAMPLE 2

An ink described in Example 2 was prepared and 0.1 g of sulfamic acid was added thereto. The ink was further heated with stirring, cooled and subjected to measurement of the nitrite ion concentration. As a result, it was found that the concentration was 0.1 ppm. This ink was filtered, deaerated, and then hermetically sealed in an ink bag, and evaluation was conducted in the same manner as that of Example 1. The amount of nitrogen generated after 15 days was 1.5 ppm.

Printing could be stably conducted without bringing about dot omission. However, after the ink was allowed to stand at room temperature for one month, good printing could not be attained even though the clogging was incomplete. This was by unstable redelivery of the ink and the ink particles exhibited "flight curve".

EXAMPLE 3

Inks 3-1 to 3-5 (shown below) were prepared in accordance with the invention were adjusted so as to have a nitride ion concentration of 0.2 to 10 ppm by conducting the same treatment as that of Example 1 or 2. For comparison, inks 3-6 to 3-8 (shown below) were used as such without conducting any adjustment of nitrate ion concentration. Inks 3-9 and 3-10 (shown below) were those which had been subjected to neutralization of the nitrite ion with sulfamic acid.

In inks 3-1 to 3-10 shown in Table 1, the values in the composition are parts by weight, and the concentration is that of the nitrite ion.

TABLE 1

| Ink | Composition | | Nitrite Ion Concentration |
|---|---|---|---|
| 3-1 | C.I. Direct Black 154 (Dye No. 16) | 2 | 10 ppm |
| | glycerin | 15 | |
| | diethylene glycol | 5 | |
| | ultrapure water | 78 | |
| 3-2 | C.I. Direct Yellow 86 | 3 | 4 ppm |
| | triethylene glycol | 28 | |

TABLE 1-continued

| Ink | Composition | | Nitrite Ion Concentration |
|---|---|---|---|
| | EDTA-disodium (chelating agent) | 0.01 | |
| | ultrapure water | 71 | |
| 3-3 | C.I. Food Black 2 (Dye No. 14) | 2.5 | 6 ppm |
| | polyethylene glycol #400 | 12 | |
| | ethylene glycol monomethyl ether | 3 | |
| | Proxel XL-2 (fungicide; a product of ICI | 0.2 | |
| | ultrapure water | 82.3 | |
| 3-4 | C.I. Direct Red 39 | 2 | 0.9 ppm |
| | triethanolamine | 15 | |
| | sodium dehydroacetate (fungicide) | 0.1 | |
| | ultrapure water | 82.9 | |
| 3-5 | C.I. Acid Red 254 | 1.5 | 0.3 ppm |
| | glycerin | 20 | |
| | N-methyl-2-pyrrolidone | 4 | |
| | potassium hydroxide | | |
| | ultrapure water | 81.5 | |
| 3-6 | C.I. Direct Black 154 (Dye No. 16) | 2 | 34 ppm |
| | glycerin | 15 | |
| | diethylene glycol | 5 | |
| | ultrapure water | 78 | |
| 3-7 | C.I. Food Black 2 (Dye No. 14) | 2.5 | 18 ppm |
| | polyethylene glycol #400 | 10 | |
| | Proxel XL-2 | 0.2 | |
| | ultrapure water | 87.3 | |
| 3-8 | C.I. Acid Red 254 | 1.5 | 11 ppm |
| | N-methyl-2-pyrrolidone | 30 | |
| | EDTA-disodium | 0.2 | |
| | ultrapure water | 68.3 | |
| 3-9 | C.I. Acid Yellow 23 (Dye No. 3) | 1 | 0.02 ppm |
| | monoethanolamine | 5 | |
| | triethanolamine | 5 | |
| | ultrapure | 89 | |
| 3-10 | C.I. Direct Blue 86 | 2 | 0 ppm |
| | diethylene glycol | 13 | |
| | triethylene glycol monomethyl ether | 4 | |
| | sodium dehydroacetate | 0.1 | |
| | ultrapure water | 80.9 | |

In the same manner as that of Example 1, inks 3-1 to 3-10 were filtered, deaerated, hermetically sealed in an ink bag, and placed in an environment of 70° C. for 15 days. Thereafter, in the same manner as that of Example 1, these inks were subjected to evaluation of delivery stability (A) in the printing with an ink-jet printer, and clogging (B) in the case where a printing head was filed with an ink and allowed to stand without providing a cap at room temperature for one month. The results are shown in Table 2.

TABLE 2

| ink | Delivery Stability (A) | Clogging After 1 Month (B) |
|---|---|---|
| 3-1 | good | good |
| 3-2 | good | good |
| 3-3 | good | good |
| 3-4 | good | good |
| 3-5 | good | good |
| 3-6 | frequent dot missing | good |
| 3-7 | frequent dot missing | good |
| 3-8 | frequent dot missing | good |
| 3-9 | good | curved flight |
| 3-10 | good | curved flight |

In Table 2, the term "frequent dot missing" refers to the condition wherein dot omission occurs at least 5 times when 120 cc of ink is subjected to continuous printing, and the term "curved flight" refers to the condition wherein the printing is missing or misaligned.

EXAMPLE 4

| Composition | |
|---|---|
| Dye No. 4 | 1 part by weight |
| glycerin | 15 parts by weight |
| ultrapure water | 84 parts by weight |

An ink having the above-described composition was heated with stirring to prepare 500 g of ink. This ink was cooled and passed through an anion exchange resin (Amberlite IRA-410; a product of Japan Organo Co., Ltd.) and then ion-chromatographed to confirm that the nitrite ion concentration was 7 ppm. Thereafter, the ink was filtered through a 1 μm-membrane filter and deaerated, and an aluminum-laminated polyethylene bag having low gas permeability was filled with the treated ink. The polyethylene bag was subjected to submerged sealing to obtain an ink bag containing an ink hermetically sealed therein. The volume of one ink bag was 120 cc. Four ink bags were placed in an environment of 70° C. for 15 days. The nitrogen concentration was then measured by gas chromatography and found to average 9 ppm.

This ink was used for printing with an ink-jet printer HG-2500 (a product of Seiko Epson Corp.). It was found that stable printing was possible without dot omission for all four of the ink bags. The head of the printer filled with this ink was allowed to stand at room temperature for one month without a cap, and the ink was delivered again. It was found that printing could be conducted in good conditions without clogging in the nozzle.

COMPARATIVE EXAMPLE 4

When an ink having the composition described in Example 4 was not passed through the anion exchange resin, the nitrite ion concentration was 32 ppm. In the same manner as that of Example 4, this ink was filtered, deaerated, hermetically sealed in an aluminum-laminated bag, placed in an environment of 70° C. for 15 days, and then measured for nitrogen concentration. The average nitrogen concentration was 14 ppm. The ink bag was opened in water, and bubbles were found to be formed in the ink bag. Moreover, printing was conducted with the three remaining bags in the same manner as that of Example 4. It was found that all three of the ink bags frequently brought about dot missing, so that no stable printing was attained.

EXAMPLE 5

| Composition | |
|---|---|
| Dye No. 17 | 2 parts by weight |
| polyethylene glycol #200 | 10 parts by weight |
| triethylene glycol | 5 parts by weight |
| ultrapure water | 83 parts by weight |

An ink having the above-described composition was prepared in the same manner as that of Example 1 and passed through an ultrafiltration membrane (HF1-43-pM1; a product of Romicon), and ultrapure water was added to compensate for the loss due to concentration by ultrafiltration. Thereafter, it was confirmed that the nitrite ion concentration of the ink was 2 ppm. This ink was filtered, deaerated, and then hermetically sealed in an ink bag, and evaluation was conducted in the same manner as that of Example 4. The amount of nitrogen generated after 15 days was 5 ppm. Further, printing stability was excellent, and no clogging occurred even after one month.

COMPARATIVE EXAMPLE 5-1

An ink having the composition described in Example 5 was prepared and 0.1 g sulfamic acid was added thereto. The ink was heated with stirring and cooled. The nitrite ion concentration was measured at 0.1 ppm. This ink was filtered, deaerated and then hermetically sealed in an ink bag, and evaluation was conducted in the same manner as that of Example 4. The amount of nitrogen generated after 15 days was 1.5 ppm. Further, printing could be stably conducted without causing dot omission. However, after the ink was allowed to stand at room temperature for one month, good printing could not be attained even though clogging was incomplete, because re-delivery of the ink was unstable and the ink particles had a "flight curve".

COMPARATIVE EXAMPLE 5-2

An ink was prepared in the same manner as in Example 5, except that Dye No. 24, which does not have any azo linkages was used instead of the dye used in Example 5. The ink was heated with stirring and cooled. The nitrite ion concentration was measured and found to be 2.5 ppm. This ink was filtered, deaerated, and then hermetically sealed in an ink bag, and evaluation was conducted in the same manner as that of Example 4. The amount of nitrogen generated after 15 days was 3.5 ppm. Further, printing could be stably conducted without bringing about dot omission. However, after the ink was allowed to stand at room temperature for one month, good printing could not be attained even though clogging was incomplete, because re-delivery of the ink was unstable and the ink particles exhibited "flight curve".

EXAMPLE 6

Inks 6-1 to 6-5 (shown below) having compositions in accordance with the invention, were adjusted so as to have a nitrite ion concentration of 0.2 to 10 ppm by conducting the same treatment as that of Example 4 or 5. Comparative inks 6-6 to 6-8 (shown below) were used as such without adjusting the nitrite ion concentration. Inks 6-9 and 6-10 (shown below) were subjected to neutralization of the nitrite ion with sulfamic acid. Comparative inks 6-11 and 6-12 (shown below) contained Dyes No. 25 and 26, each without any azo linkage in the molecular structure.

Inks 6-1 to 6-12 are shown in Table 3, with values in the composition parts by weight, and showing the nitrite ion concentration.

TABLE 3

| Ink | Composition (Parts by Weight) | | Concentration (Nitrite Ion) |
| --- | --- | --- | --- |
| 6-1 | Dye No. 7 | 2 | 10 ppm |
|  | glycerin | 15 |  |
|  | diethylene glycol | 5 |  |
|  | ultrapure water | 78 |  |
| 6-2 | Dye No. 10 | 3 | 4 ppm |
|  | triethylene glycol | 28 |  |
|  | EDTA-disodium | 0.01 |  |

TABLE 3-continued

| Ink | Composition (Parts by Weight) | | Concentration (Nitrite Ion) |
| --- | --- | --- | --- |
|  | (chelating agent) |  |  |
|  | ultrapure water | 71 |  |
| 6-3 | Dye No. 14 | 2.5 | 6 ppm |
|  | polyethylene glycol #400 | 12 |  |
|  | ethylene glycol monomethyl ether | 3 |  |
|  | Proxel XL-2 (fungicide; a product of ICI) | 0.2 |  |
|  | ultrapure water | 82.3 |  |
| 6-4 | Dye No. 21 | 2 | 0.9 ppm |
|  | triethanolamine | 15 |  |
|  | sodium dehydroacetate (fungicide) | 0.1 |  |
|  | ultrapure water | 82.9 |  |
| 6-5 | Dye No. 23 | 1.5 | 0.3 ppm |
|  | glycerin | 20 |  |
|  | N-methyl-2-pyrrolidone | 4 |  |
|  | potassium hydroxide |  |  |
|  | ultrapure water | 81.5 |  |
| 6-6 | Dye No. 10 | 2 | 34 ppm |
|  | glycerin | 15 |  |
|  | diethylene glycol | 5 |  |
|  | ultrapure water | 78 |  |
| 6-7 | Dye No. 14 | 2.5 | 18 ppm |
|  | polyethylene glycol #400 | 10 |  |
|  | Proxel XL-2 | 0.2 |  |
|  | ultrapure water | 87.3 |  |
| 6-8 | Dye No. 21 | 1.5 | 11 ppm |
|  | N-methyl-2-pyrrolidone | 30 |  |
|  | EDTA-disodium | 0.2 |  |
|  | ultrapure water | 68.3 |  |
| 6-9 | Dye No. 4 | 1 | 0.02 ppm |
|  | monoethanolamine | 5 |  |
|  | triethanolamine | 5 |  |
|  | ultrapure water | 89 |  |
| 6-10 | Dye No. 16 | 2 | 0 ppm |
|  | diethylene glycol | 13 |  |
|  | triethylene glycol monomethyl ether | 4 |  |
|  | sodium dehydroacetate | 0.1 |  |
|  | ultrapure water | 80.9 |  |
| 6-11 | Dye No. 25 | 1.5 | 1 ppm |
|  | glycerin | 15 |  |
|  | N-methyl-2-pyrrolidone | 3 |  |
|  | ultrapure water | 80.5 |  |
| 6-12 | Dye No. 26 | 3 | 5 ppm |
|  | diethylene glycol | 20 |  |
|  | sodium dehydroacetate | 0.1 |  |
|  | ultrapure water | 76.9 |  |

Inks 6-1 to 6-12 were filtered, deaerated, hermetically sealed in an ink bag, and placed in an environment of 70° C. for 15 days in the same manner as described in Example 4. Thereafter, the inks were tested as in Example 1. These inks were evaluated for delivery stability (A) during printing with an ink-jet printer, and clogging (B) wherein a printing head was filled with an ink and allowed to stand without providing a cap at room temperature for one month. The results are shown in Table 4.

TABLE 4

| ink | (A) Delivery Stability | (B) Clogging After 1 Month |
| --- | --- | --- |
| 6-1 | good | good |
| 6-2 | good | good |
| 6-3 | good | good |
| 6-4 | good | good |
| 6-5 | good | good |
| 6-6 | frequent dot missing | good |
| 6-7 | frequent dot missing | good |
| 6-8 | frequent dot missing | good |
| 6-9 | good | curved flight |
| 6-10 | good | curved flight |

TABLE 4-continued

| ink | (A) Delivery Stability | (B) Clogging After 1 Month |
|---|---|---|
| 6-11 | good | curved flight |
| 6-12 | good | curved flight |

In Table 4, the term "frequent dot missing" means a state wherein the omission of dot occurs at least 5 times when 120 cc of ink was subjected to continuous printing, and the term "curved flight" means a state wherein printing is missing or misaligned.

The ink-jet recording ink prepared in accordance with the invention has a nitrite ion concentration adjusted to between about 0.2 to 10 ppm. The dye may be an azo dye having at least one azo linkage in the molecular structure. Adjustment of the nitrite ion concentration results in an ink which does not evolve nitrogen gas even when placed in a high-temperature environment. Accordingly, these inks are highly stable during transportation and storage at high temperature. They have a long shelf-life and provide improved stable printing in an ink-jet printer. The inks prepared in accordance with the invention prevent "curved flight" which tends to lower print quality and is a sign of clogging.

It will thus be seen that the objects set forth above, among those made apparent from the preceding description, are efficiently attained and, since certain changes may be made in the above composition of matter, in the above method, and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A aqueous ink-jet printing ink composition, comprising an effective amount as a colorant of a dye in water and having a nitrite ion concentration of between about 0.2 to 10 ppm and wherein the molecular structure of the dye includes at least one azo linkage.

2. The ink-jet printing ink composition of claim 1, wherein the dye is present in an amount from about 0.5 to 10 parts by weight, based on the total weight of the composition.

3. The ink-jet printing ink composition of claim 1, further including a wetting agent.

4. The ink-jet printing ink composition of claim 3, wherein the wetting agent is a water-soluble organic solvent.

5. The ink-jet printing ink composition of claim 4, wherein the viscosity of the ink is equal to or less than 50 mPa.

6. The ink-jet printing ink composition of claim 4, wherein the wetting agent is present in an amount between about 5 to 80 percent by weight.

7. The ink-jet printing ink composition of claim 1, wherein the water is ultrapure water.

8. The ink-jet printing ink composition of claim 4, the ink is between about 12 to 14.

9. The ink-jet printing ink composition of claim 4, wherein the wetting agent is selected from the group consisting of polyhydric alcohols, ether and ester derivatives of polyhydric alcohols, water-soluble amines, cyclic nitrogenous compounds and mixtures thereof.

10. An aqueous ink-jet printing ink composition, comprising:
   an effective amount as a colorant of a dye including at least one azo linkage;
   between about 5 to 80 weight percent of a water-soluble organic solvent wetting agent; and
   the balance water;
   the composition having between about 0.2 to 10 ppm nitrite ion concentration.

11. The aqueous ink-jet printing ink composition of claim 10, wherein the pH is between about 12 and 14.

12. A method of reducing the nitrite ion concentration in an ink-jet printing ink composition, comprising:
   dissolving of a dye containing at least one azo linkage as a colorant in water;
   dissolving between about 50 to 80 weight percent of a water-soluble organic solvent of a wetting agent in the dye and water heating the composition to remove dissolved gases; treating the composition to remove nitrous acid to reduce the nitrite ion concentration to between about 0.2 to 10 ppm; and
   sealing in a container having low gas permeability.

13. The method of claim 12, wherein the treating step is accomplished by passing the composition through an ion exchange resin.

14. The method of claim 12, wherein the treating step is accomplished by passing the composition through an ultrafiltration membrane.

15. An ink-jet printing ink container, comprising:
   an hermetically sealed ink bag made of a material having low gas permeability; and
   an ink-jet printing ink composition including an effective amount of a colorant of a dye including at least one azo linkage, between about 5 to 80 weight percent of an organic solvent wetting agent, and the balance water, the composition having between about 0.2 to 10 ppm nitrite ion concentration, sealed therein.

* * * * *